United States Patent [19]

Bright

[11] 4,365,668
[45] Dec. 28, 1982

[54] SIDE WALL CLAMP FOR DOWNHOLE TOOLS

[75] Inventor: Gary R. Bright, Tulsa, Okla.

[73] Assignee: Standard Oil Company (Indiana), Chicago, Ill.

[21] Appl. No.: 242,664

[22] Filed: Mar. 11, 1981

[51] Int. Cl.³ ............................................. E21B 23/00
[52] U.S. Cl. .................................... 166/214; 166/212; 166/206
[58] Field of Search ............... 166/214, 212, 206, 104, 166/117.5; 175/77, 279, 285

[56] References Cited

U.S. PATENT DOCUMENTS

| | | | |
|---|---|---|---|
| 2,053,698 | 9/1936 | Church | 175/285 |
| 2,358,470 | 9/1944 | Oswald | 175/77 |
| 2,511,508 | 6/1950 | McClinton | 175/77 |
| 2,692,648 | 1/1952 | Simmons | 166/214 |
| 2,748,872 | 6/1956 | Johnston | 166/206 |

Primary Examiner—Ernest R. Purser
Assistant Examiner—Thuy M. Bui
Attorney, Agent, or Firm—Lansing M. Hinrichs; William T. McClain; William H. Magidson

[57] ABSTRACT

A side wall clamp is disclosed for use in conjunction with downhole tools, the clamp having a fail-safe mechanism which permits unclamping of the tool from the bore hole wall even if the clamp actuator means is inoperative, by exerting upward pull on the wire line or drill string to which the tool is attached.

4 Claims, 5 Drawing Figures

SIDE WALL CLAMP FOR DOWNHOLE TOOLS

BACKGROUND OF INVENTION

This invention relates to a side wall clamp for securing downhole tools in a cased or uncased bore hole. The clamp of this invention has particular utility when employed in conjunction with tools which are suspended on a wireline but also can be used in conjunction with tools carried by a string of drill pipe.

In the drilling of bore holes for exploration or production, it is frequently desirable to position various kinds of tools within the bore hole for obtaining measurements such as seismatic movements, gavitational forces, and the like, or for the performance of operations such as side wall coring or bore hole perforation. During such measurements or operations, it is frequently desired to firmly clamp or support the downhole tool in contact with the side wall of the bore hole or casing to prevent both vertical and lateral motion of the tool during the measurement or operation being conducted.

Various mechanical arrangements have been proposed heretofor such as inflatable packers or flexible strips or arms which can be mechanically actuated to engage the wall of the bore hole or casing and thus firmly support a tool in a fixed position. Defects in the prior devices are that they are subject to operational failure which may leave the tool in locked position within the bore hole with the result that it must be abandoned, destroyed, or only recovered by expenditure of great time and effort.

It is accordingly an object of the present invention to provide a side wall clamp for downhole tools which automatically releases the tool in response to slight upward movement of the wireline or drill string regardless of whether or not the clamp actuation mechanism is operative, thus providing a fail-safe operation.

A further object is to provide a clamping mechanism which in normal operation may be utilized sequentially (1) to clamp a tool at one location, (2) to be released, and (3) to again be actuated to clamp the tool at a second location without removal of the tool from the bore hole.

SUMMARY OF THE INVENTION

In a downhole tool, a side wall clamping apparatus is provided comprising an arm having means at one end for engaging the opposite side of the bore hole from the tool, a rotator supporting the other end of the arm, and a rotary link pivotally connected to a fixed portion of the tool and also pivotally connected to the rotator. Also provided are actuator means which, for example, can be a pneumatic or hydraulic piston or an electric motor which drives a screw or nut. The actuator means is carried by the tool and pivotally connected to the rotator at a point remote from the point of connection of the rotary link whereby movement of the actuator means causes movement of said rotator and the arm carried thereby. The arm and the rotator each have normally abutting surfaces which together constitute a sear for normally holding the arm in fixed position with respect to the rotator. A spring means is provided interconnected between an element of said tool and said arm for maintaining the sear surfaces in abutting relationship except when the tool is moved upwardly relative to said arm. Thus, when the tool is clamped in a bore hole and the actuator is not operative, simply taking up the wire line or drill string produces relative vertical motion between the tool and the arm releasing the sear and allowing the arm to rotate away from the wall of the bore hole. To facilitate this rotation, a cam groove in the side of the rotator receives a follower pin carried by the arm and cams the arm toward the tool as relative vertical movement occurs.

DETAILED DESCRIPTION OF THE INVENTION

Figure 1:
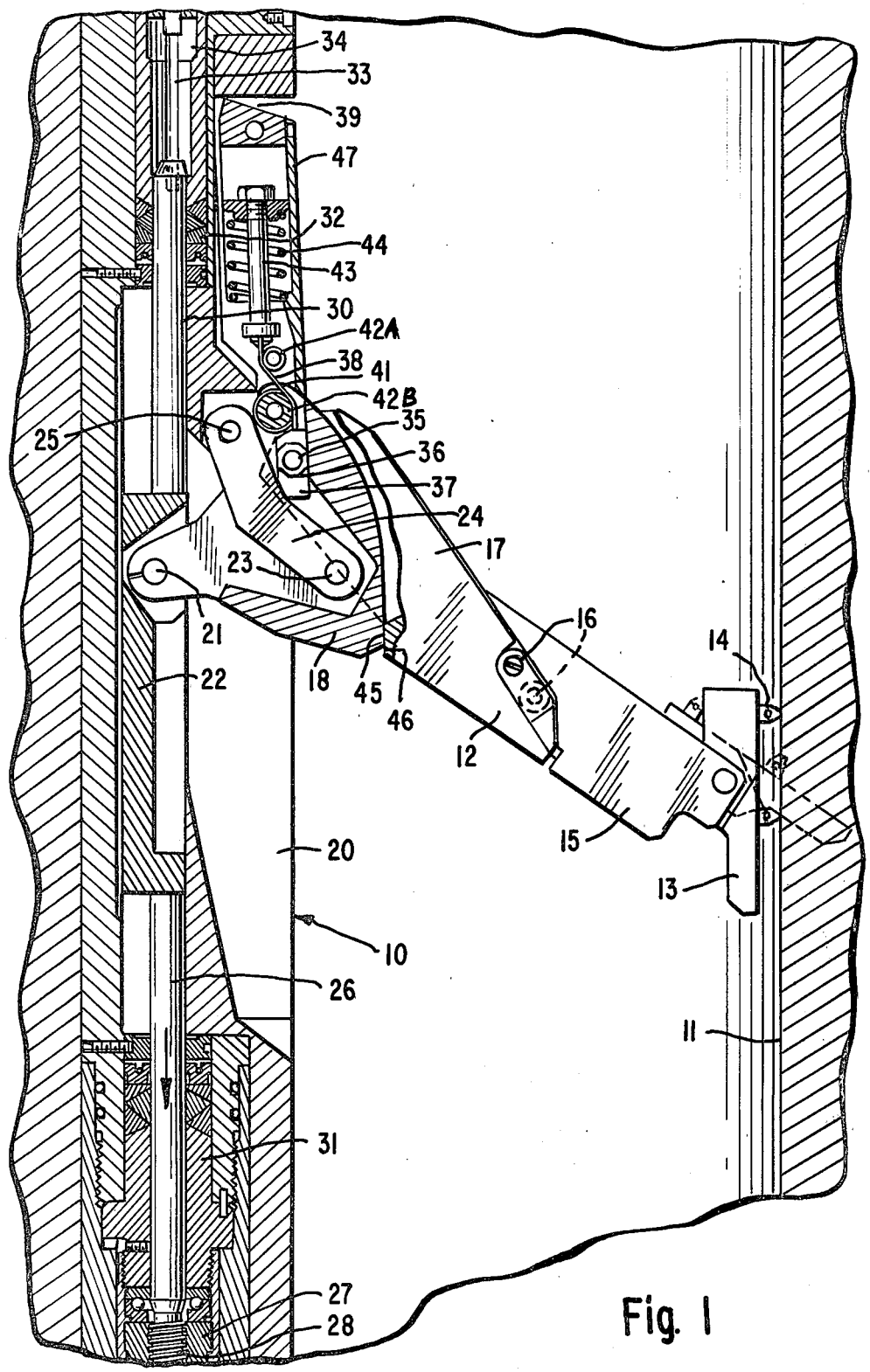
FIG. 1 is a side view partially in section showing a downhole tool equipped with the side wall clamp of this invention, the clamp being shown in clamping position.

This invention can best be understood by describing a preferred embodiment thereof which is illustrated in the drawings.

Downhole tool 10 is illustrated in FIG. 1, received in a bore hole 11 with arm 12 extended in clamping position from tool 10 to the opposite wall of the bore hole 11. A shoe 13 provided with pointed tool steel pins 14 for engaging the wall of the bore hole is pivotally mounted on the end of arm 12. A spring (not shown) is provided to hold the shoe in the position indicated in broken lines in FIG. 1, when it is not in contact with the bore hole wall. The outboard portion 15 of arm 12 is secured by retaining pin 16 and is sized according to the diameter of the bore hole in which the tool is received. Thus, if the tool 10 is to be utilized in a different bore hole, an outboard portion 15 of different length appropriate to the bore hole diameter will be utilized.

Figure 4:
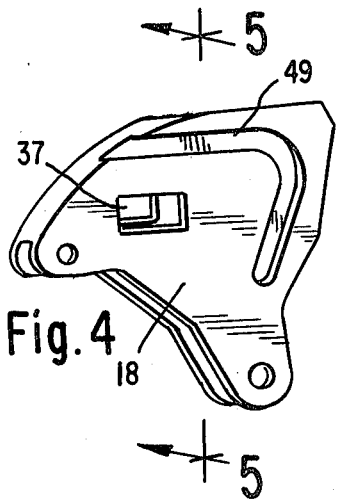
FIG. 4 is an isometric view of the rotator.
Figure 5:
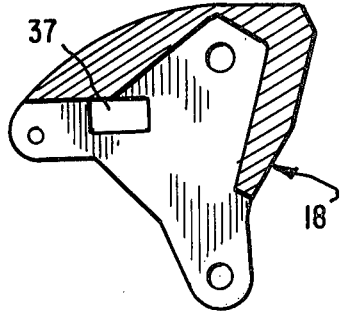
FIG. 5 is a section taken on line 5—5 of FIG. 4.

The inboard portion 17 of arm 12 is slotted so as to fit over a rotator 18 disposed within a recess 20 provided within the tool 10. The contours of the rotator 18 are best shown in FIGS. 4 and 5. The rotator is attached by a pivot pin 21 to a slideable actuator block 22. A second pivot pin 23 connects the rotator 18 to a rotating link 24, which is, in turn, attached by a third pivot pin 25 to a fixed portion of the tool 10. This arrangement provides for rotation of the rotator 18 when the actuator block 22 is moved relative to the body of the tool 10. Such movement is effected by an actuator rod 26 connected to block 22. Movement of the actuator rod in response to signals sent from the surface may be effected by any conventional means. In the embodiment shown in FIG. 1, a motor driven nut 27 (motor not shown) engages threads 28 on rod 26 to advance or retract the actuator block 22. An actuator rod extension 30 projects from the upper end of the block 22 and serves two functions. First, both the actuator rod 26 and the extension 30 pass through seal 32 and seal support 31 into the body of the tool 10, and the motor or other actuator means, which can be a pneumatic or hydraulic cylinder, does not have to overcome fluid pressure within the bore hole 11. Second, the actuator rod extension 30 is connected by a rod 33 to a transducer 34 which can transmit a signal to the surface indicating the position of the actuator block 22. Such signal can also be used to control the motor or other actuation means.

The above-described elements of the apparatus constitute those parts which come into play during normal operation of the side wall clamp when the actuation means is fully operative. When the tool 10 is moved vertically within the bore hole 11 the various elements are in the positions shown in FIG. 3. The actuator rod 26 and block 22 have been moved upwardly with respect to the body of tool 10 moving the rotator 18 and the arm 12 supported thereby downwardly into the recess 20 in the tool body. Thus, the tool 10 may be freely moved up or down within the bore hole by shortening or lengthening the wireline or drill string. When the tool is stopped at a desired location, it is clamped to the sidewall by sending an appropriate signal from the surface to actuate the motor or other driver and move the actuator block 22 downwardly causing the rotator 18 and arm 12 to move away from the tool 10 until the opposite side of the bore hole is engaged by the shoe 13 to securely clamp the tool in place.

Figure 3:
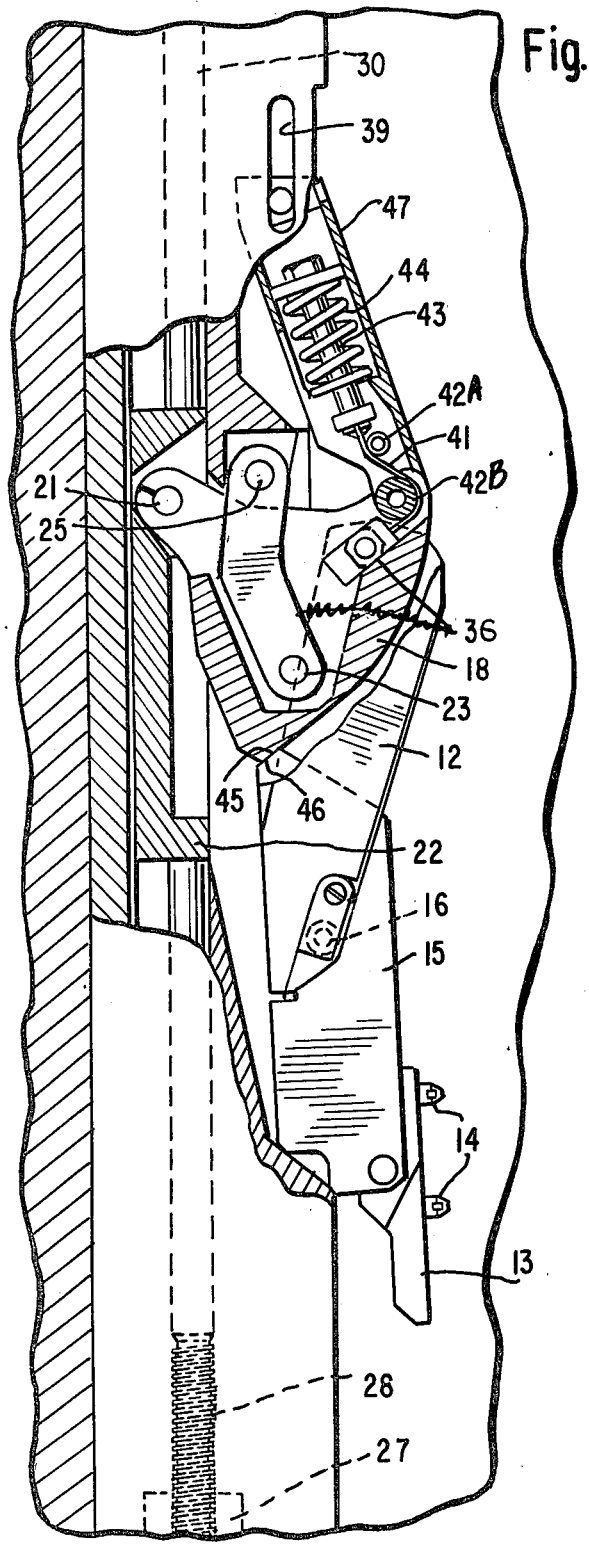
FIG. 3 is a side view partially in section showing the elements of the clamp as they are positioned prior to the clamping operation or thereafter when unclamping has been effected by operation of the clamp actuation means.

Those elements of the apparatus which are particular to the fail-safe feature of the sidewall clamp are described below. The inner portion 17 of the arm 12 is not rigidly connected to rotator 18 but is pivotally attached by a pin 35 to a sliding block 36 received within a rectangular slot 37 provided in rotator 18. Thus, the arm 12 is movable in the direction parallel to the walls of slot 37 with respect to rotator 18 as block 36 slides in slot 37. Sliding block 36, however, is connected by a flexible cable 41 which passes over a pair of sheaves 42A and 42B to the head of a bolt 43 which in cooperation with helical spring 44 exerts a pulling force on block 36 which is in the upward direction when the rotator 18 is in the position shown in FIG. 1. This pulling force in normal operation maintains two abutting surfaces 45 and 46 in contact with each other to maintain the arm 12 and rotator 18 in fixed relationship as shown in FIGS. 1 and 3. In FIG. 3, it will be noted that the lower end of the spring mount 47, which is slideably connected to the tool body by a pin which extends into slots 39 provided in the tool body, is moved away from the tool body by the action of the rotator 18 in retracting the arm 12. The lower end of the spring mount 47 is pivotally connected to rotator 18 by the pin which carries sheave 42B.

The two abutting surfaces 45 and 46 constitute a sear which is actuated or released by relative movement of the arm 12 and rotator 18 in a direction parallel to the walls of slot 37 to disengage the abutting surfaces 45 and 46. Such disengagement is readily effected in situations where the clamp is in the extended clamping position by simply pulling upwardly on the wire line or drill string overcoming the force exerted by spring 44. This moves surface 45 upwardly away from surface 46 and permits arm 12 to rotate downwardly unclamping the tool 10 from the side wall of the bore hole 11. This operation is normally utilized in cases where the actuator means is not operable but, as will be apparent, can be utilized at any time if so desired.

Figure 2:
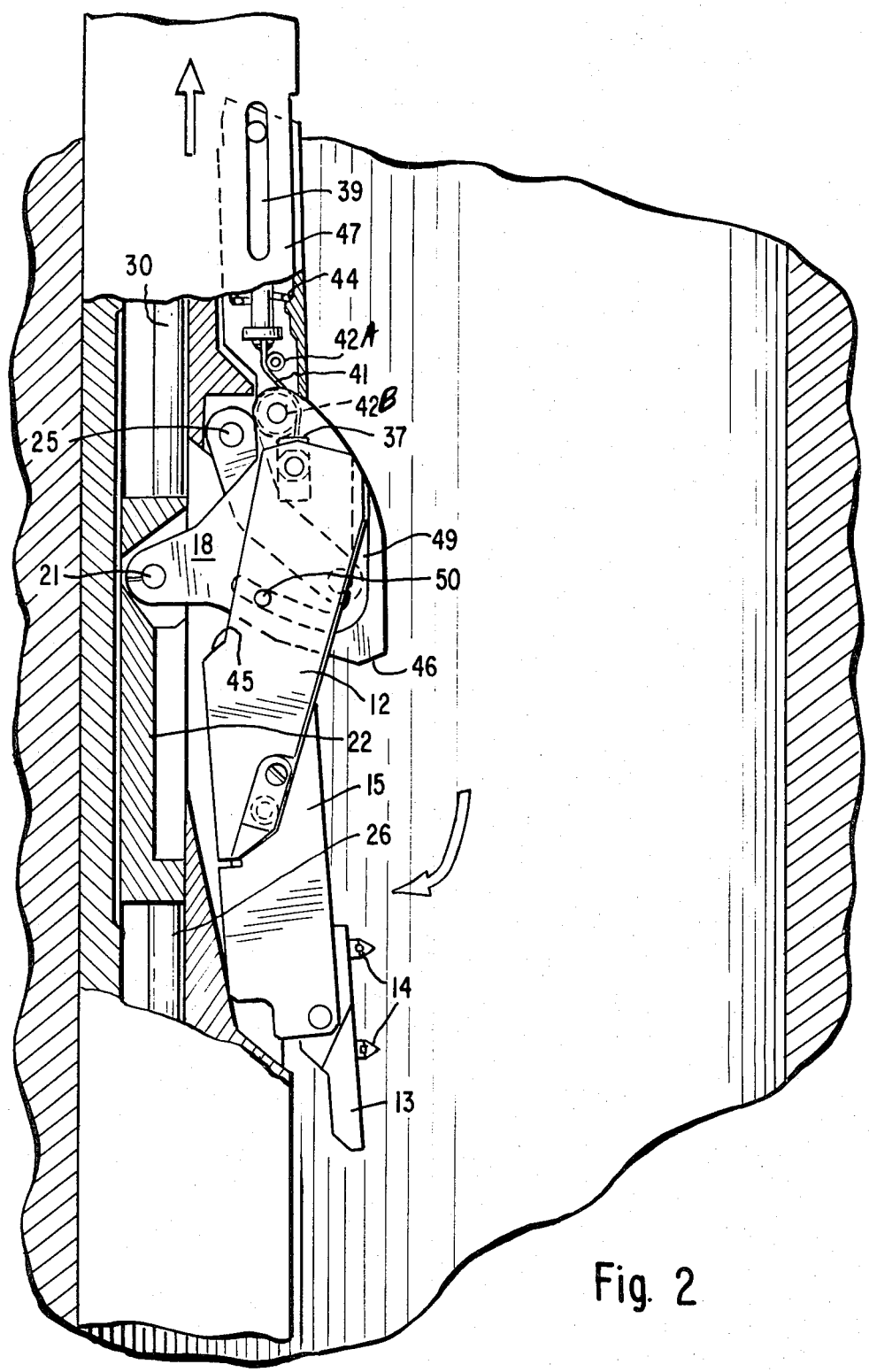
FIG. 2 is a side view partially in section showing the elements of the clamp in the released fail-safe position.

To accomplish full retraction of the arm 12 from the position shown in FIG. 1 to that shown in FIG. 2, a generally J shaped cam groove 49 (see FIG. 4) is provided in one side of the rotator 18 and cooperates with a follower pin 50 (see FIG. 2) attached to the inner end of the arm 12 to pull the arm from extended to retracted position as the tool moves upwardly with respect to the arm immediately following disengagement of the sear. With the arm 12 in the fail-safe, retracted position shown in FIG. 2, the tool may be readily withdrawn from the bore hole. At the surface, the actuator mechanism can be repaired and the arm reset with respect to the rotator to bring surfaces 45 and 46 back into abutting relationship reestablishing the sear, and the tool is ready for use.

From the foregoing, it will be apparent that a very effective downhole tool clamping device with fail-safe protection incorporated therein has been provided. Various changes and modifications such as will present themselves to those familiar with the art may be made in the apparatus described herein without departing from the spirit of this invention whose scope is commensurate with the following claims:

I claim:

1. In a downhole tool, a side wall clamping apparatus comprising an arm having means at one end for engaging the opposite side of the bore hole from said tool, a rotator supporting the other end of said arm, a rotary link pivotally connected to a fixed portion of said tool and pivotally connected to said rotator, actuator means carried by said tool and pivotally connected to said rotator at a point remote from the point of connection of the rotary link whereby movement of said actuator means causes movement of said rotator and the arm carried thereby, said arm and said rotator each having normally abutting surfaces which together constitute a sear holding said arm in fixed position with respect to said rotator, and spring means interconnected between an element of said tool and said arm for maintaining said surfaces in abutting relationship except when said tool is moved upwardly relative to said arm overcoming the force exerted by said spring and disengaging said sear.

2. The side wall clamping apparatus as described in claim 1 wherein the means for engaging the opposite side of the bore hole in a shoe pivotally mounted on the end of said arm.

3. In a downhole tool, a side wall clamping apparatus comprising: an arm having means at one end for engaging the opposite side of the bore hole from said tool, a rotator supporting the other end of said arm, a rotary link pivotally connected to a fixed portion of said tool and pivotally connected to said rotator, actuator means carried by said tool and pivotally connected to said rotator at a point remote from the point of connection of the rotary link wherey movement of said actuator means effects rotation of said rotator and the arm carried thereby, said arm and said rotator each having normally abutting surfaces which together constitute a sear holding said arm in extended position with respect to said rotator, and elastic means interconnected between an element of said tool and said arm for maintaining said surfaces in abutting relationship except when said tool is moved upwardly relative to said arm to release the sear.

4. In a downhole tool, a side wall clamping apparatus comprising an arm having means at one end for engaging the opposite side of the bore hole from said tool, a rotator element supporting the other end of said arm, actuator means carried by said tool and connected to said rotator whereby movement of said actuator means causes movement of said rotator and the arm carried thereby, said arm and said rotator each having normally abutting surfaces which together constitute a sear holding said arm in extended position with respect to said rotator, and means for maintaining said surfaces in abutting relationship except when said tool is moved upwardly relative to said arm to release the sear.

* * * * *